United States Patent [19]

Richeson, Jr. et al.

[11] 3,772,456

[45] Nov. 13, 1973

[54] FAX CARRIER DETECTOR

[75] Inventors: William E. Richeson, Jr.; Joel K. Roach, both of Fort Wayne, Ind.

[73] Assignee: The Magnavox Company, Fort Wayne, Ind.

[22] Filed: Mar. 26, 1970

[21] Appl. No.: 22,937

[52] U.S. Cl. .................. 178/88, 179/2 DP, 325/320

[51] Int. Cl. .................................................. H04n 1/32

[58] Field of Search ......................... 325/55, 64, 389, 325/390, 393, 399, 403, 408, 416; 179/84 VF, 69.5, 2 C, 2 R; 343/228; 178/66, 6; 340/171

[56] References Cited

UNITED STATES PATENTS

| | | | |
|---|---|---|---|
| 3,531,597 | 9/1970 | Andrews et al. | 179/15 P |
| 3,049,710 | 8/1962 | Buesing et al. | 343/228 |
| 2,590,310 | 8/1952 | Hanchett, Jr. | 343/228 |
| 2,559,959 | 7/1951 | Hipps | 343/228 |
| 2,843,660 | 7/1958 | Franklin et al. | 179/4 |
| 3,317,844 | 5/1967 | Shimabukuro | 178/69.5 F |
| 3,432,613 | 3/1969 | Saeger et al. | 178/6 |
| 3,441,665 | 4/1969 | Wuensch | 179/4 |
| 3,444,315 | 5/1969 | Shimabukuro et al. | 178/6 |
| 3,507,980 | 4/1970 | Rugaber et al. | 179/4 |
| 3,586,778 | 6/1971 | Riethmeier et al. | 179/2 C |
| 3,593,151 | 7/1971 | Veale | 178/88 R |

OTHER PUBLICATIONS

Pulse, Digital, and Switching Waveforms, Millman & Taub, 1965, pgs. 389–394, 402, 518–523, TR7835 M55P Scientific Library.

Q.S.T., March, 1964, pgs. 11–13.

*Primary Examiner*—Benedict V. Safourek
*Attorney*—Richard T. Seeger

[57] ABSTRACT

An improved scheme for effecting the selective energization of a fascimile or other receiver is disclosed in the form of a bis-stable trigger circuit which is responsive to predetermined signals indicative of the fact that transmission of information has begun or has ended to switch between its enable and disable states. The change of state of the trigger circuit is then effective to enable or partially disable the receiver. Provision is made whereby the turn-on time may be made substantially less than the turn-off time so that the receiver will not turn-off due to noise, momentary line drop outs or other temporary interruptions in transmission.

3 Claims, 5 Drawing Figures

INVENTORS
WILLIAM E. RICHESON &
JOEL K. ROACH
BY Jeffers and Young
ATTORNEYS

INVENTORS
WILLIAM E. RICHESON &
JOEL K. ROACH
BY Jeffers and Young
ATTORNEYS

INVENTORS
WILLIAM E. RICHESON
JOEL K. ROACH
BY Jeffers and Young
ATTORNEYS

FAX CARRIER DETECTOR

CROSS REFERENCE TO RELATED APPLICATIONS

The present invention relates to an improved turn-on and turn-off circuit which would find particular utility in a facsimile receiver for example, of the type disclosed in U.S. Pat. application Ser. No. 669,315 filed Sept. 20, 1967 in the names of Glenn A. Reese and Paul J. Crane and entitled "FACSIMILE SYSTEMS" and in improvements thereon especially as represented by U.S. Pat. application Ser. No. 22,930 filed Mar. 26, 1970 in the names of William E. Richeson and Joel K. Roach and entitled "FACSIMILE REVERSE SIGNALING SYSTEM," now abandoned.

BACKGROUND OF THE INVENTION

This invention relates to facsimile receiving equipment and more particularly to an improved circuit for effecting the energization or de-energization of a portion of the facsimile receiving equipment. Automatic shut-off circuits are well known in the prior art both in the facsimile receiver environment and in the home television receiver art. A typical automatic shut-off device will consist of a carrier detector circuit which is responsive to the absence of a carrier signal for a predetermined time to effect the shut-off of the equipment. Prior art facsimile receivers have used this general approach both for turning on and turning off the receiver, however, such prior art circuitry suffers from the very substantial defect that it is virtually impossible to make the turn-on time different from the turn-off time. It may be readily seen that to be able to independently control these times is a highly desirable situation since one would want the circuit to be responsive to the presence of a carrier signal almost immediately or after some defined integration time to turn the equipment on but at the same time would desire a reasonable time delay after an indication of a lack of carrier signal before the receiving equipment turns off so as to preclude false indications such as noise, momentary line drop out or other temporary interruptions in transmission causing the receiving equipment to shut off.

SUMMARY OF THE INVENTION

The present invention overcomes the prior art defects by providing an improved carrier detector circuit for facsimile or other receiving equipment comprising a pair of current control devices coupled together to form a trigger circuit and having independent controls therein for modifying the hysteresis loop of the trigger circuit as well as the threshold level at which switching occurs.

Accordingly, it is one object of the present invention to provide an improved turn-on and turn-off circuit for a receiver.

It is another object of the present invention to provide a carrier detector circuit which has a turn-on response time which is substantially less than its turn-off response time.

It is a further object of the present invention to provide a method of selectively energizing a facsimile receiver which is not deleteriously effected by noise or momentary interruptions in transmission.

The present invention has particular utility in a facsimile transmission system in which the information is transmitted over standard telephone lines utilizing a frequency modulated audio carrier signal so that the information lies, for example, in a spectrum between 1,500 and 2,450 cycles per second. The present carrier detector circuit is responsive to the detection of any signal between 1,500 and 2,450 cycles per second to energize normally quiescent portions of the receiver system in preparation for reproducing a transmitted document. The present carrier detector circuit responds to any frequency below 1,250 cycles per second of sufficient duration to de-energize a portion of the receiver system. Specifically, a stop tone of 1,100 cycles per second is generated by the transmitter to indicate the termination of transmission.

Accordingly, it is a still further object of the present invention to provide a carrier detector circuit in a facsimile receiver which is responsive to the reception of information signals to energize a normally quiescent portion of that receiver and which is responsive to a special signal outside of the normal information spectrum to de-energize the receiver.

BRIEF DESCRIPTION OF THE DRAWING

The structure and operation of the invention, together with further objects and advantages may be better understood from the following description given in conjunction with the accompanying drawing in which.

DESCRIPTION OF THE PREFERRED EMBODIMENT

Figure 1A:
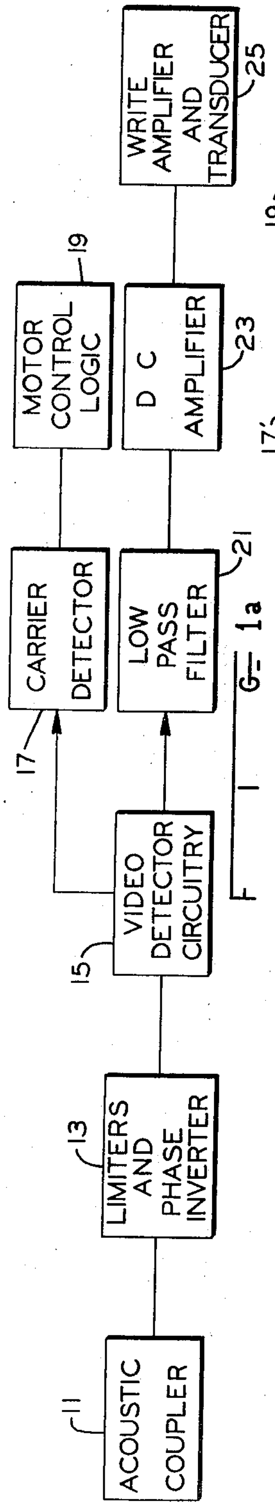
FIG. 1*a* shows a block diagram of a facsimile receiving system with a prior art carrier detector connected directly to the video detector circuitry.

Turning now to FIG. 1*a*, the facsimile receiver is seen to functionally consist of an acoustic coupler 11 which may be sonically coupled to a standard telephone handset and the output signal of which is fed to a limiter and phase inverter 13 which in turn drives the video detector circuitry 15. The prior art carrier detector 17 which is shown in detail in FIG. 2*a* was directly responsive to the video detector circuitry and its output was used to control the motor control logic 19. The output of the video detector circuitry 15 was also passed through a low pass filter 21 to drive a DC amplifier 23 which in turn drove the write amplifier and transducer 25 for imprinting the transmitted information on a copy paper.

Figure 1B:
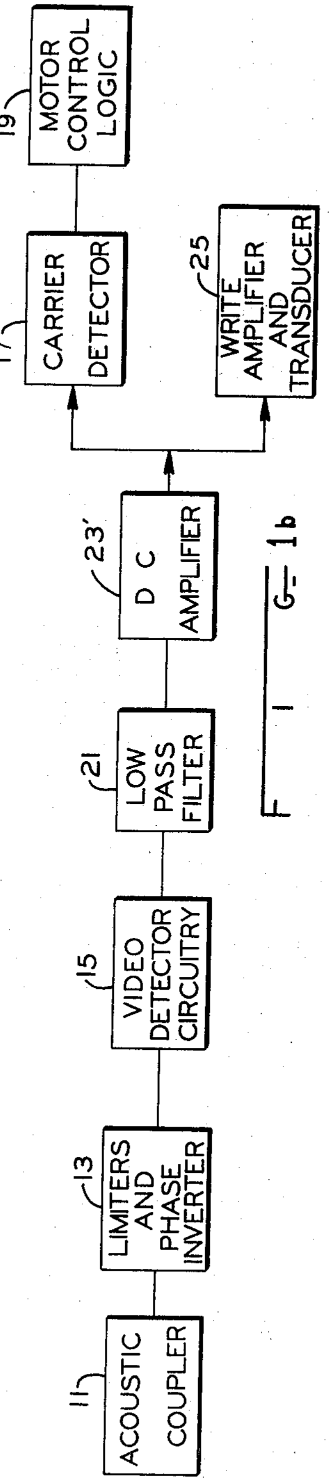
FIG. 1*b* shows the facsimile receiver of FIG. 1a illustrating the new positioning of the carrier detecting circuit of the present invention.

Turning now to FIG. 1*b*, wherein like reference numerals correspond to functional equivalents in the block diagram of FIG. 1*a* we again find an acoustic coupler 11 feeding a signal to limiter and phase inverter 13 which in turn supplies a signal to video detector 15. The video detector circuitry 15 has only a single output which passes through low pass filter 21 and drives the DC amplifier 23'. The output of DC amplifier 23' is divided and a portion utilized to drive the write amplifier and transducer 25 as before, however, the new carrier detector circuit 17' is also responsive to the output of DC amplifier 23' and it in turn controls the motor control logic 19.

The circuits of FIGS. 1a and 1b of course have numerous common characteristics which while not critical to the present invention may aid in an overall understanding of the facsimile receiver environment. The input signals to the acoustic coupler 11 are audio signals varying between 1,500 and 2,450 cycles per second for the information spectrum and a stop tone of 1,100 cycles per second. The acoustic coupler serves as a transducer to change these to electrical signals of the same frequencies. The limiters and phase inverter convert these signals to square wave signals of approximately 5 volts peak to peak value having the same frequency as the input from the phone coupler and then inverts this square wave signal so as to form a series of pulses of double the frequency of the input signal. These pulses of approximately 3 volts magnitude are again converted to square wave pulses having a given amplitude, a repetition rate and a duration that is related to the frequency of the input pulses by the video detector circuitry 15. The output of the video detector circuitry 15 is fed to a low pass filter 21 which converts the pulses to a usable level by filtering the pulses and allowing the average DC level of the pulses to pass. Thus, the output of the low pass filter is zero volts for a 3,000 cycle per second input to the video detector and −3.5 volts for a 4,900 cycle per second video detector input. The DC amplifier inverts and amplifies the low pass filter output so as to supply a signal varying between 0 and 7 volts to the write amplifier and transducer. The write amplifier is a high gain current amplifier which maintains this 0 to 7 volt information variation while supplying the high currents necessary to drive the transducer.

The motor control logic 19 which is responsive to the carrier detector 17 or 17' requires the concurrence of numerous signals such, for example, as might indicate the cover on the receiving equipment to be closed or an adequate supply of copy paper to be present in addition to an indication from the carrier detector that an information signal is being transmitted before it gives a positive indication, that is an indication which energizes the normally quiescent portions of the receiving equipment. In one particular facsimile receiver, this normally quiescent portion is a 360 cycle per second square wave power supply which drives the main drive motor of the facsimile receiver as well as other portions of the receiver. Thus, it can be seen that the carrier detector circuit in this environment is effective to turn on and off a portion only of the receiver. In various portions of the specification and claims, this will be referred to as selectively energizing, energizing and deenergizing, activating and deactivating, turning on and turning off, enabling and disabling, and enabling and partially disabling the receiver and in all instances this language is intended to convey the idea that all or part of the receiver may be deenergized or energized.

Figure 2A:
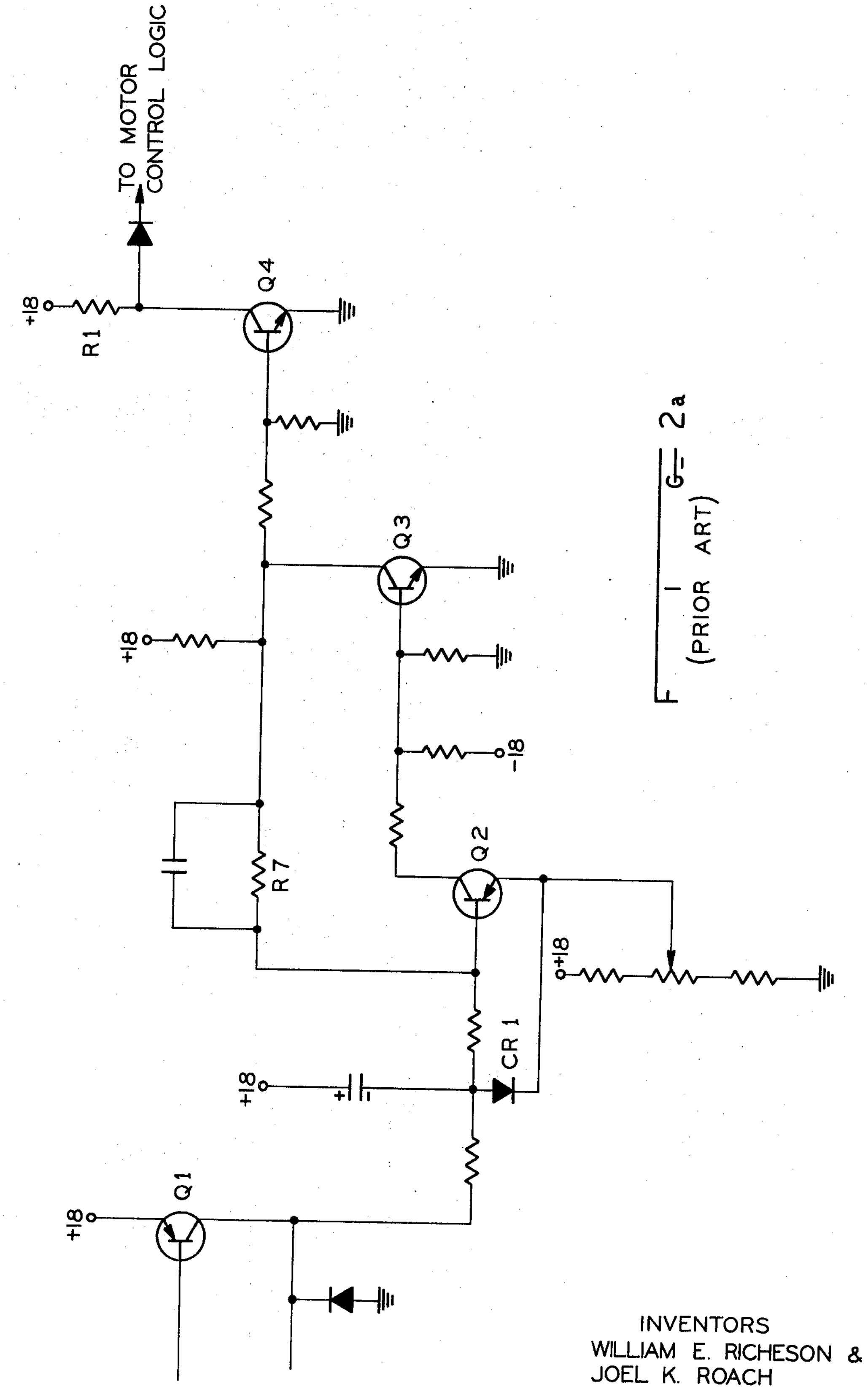
FIG. 2a (PRIOR ART)
FIG. 2*a* is a schematic diagram of a prior art carrier detector circuit.

Turning now to FIG. 2*a* which shows in schematic form the prior art carrier detector as used in the prior art facsimile receiver of FIG. 1a, we see several inherent drawbacks in the circuit. In use, this circuit exhibits an undesirable characteristic in that its turn-on and turn-off characteristics are not independently adjustable and are very rapid. In one specific embodiment, the turn-on time was approximately 0.02 seconds and the turn-off time was approximately 0.01 seconds. Should a momentary line drop out occur, this detector circuit will drop out and cause a shut down of the receiver unit. This circuit will react to any undesirable noise which may be present due to the linearity of the output voltage at the anode of CR1 vs. the frequency input to the last stage of of the video detector, that is, to the base of Q1. In the selected system design a signal spectrum above a certain frequency is meant to turn on the system; therefore, it is undesirable to integrate the signal spectrum below this range as this would contribute to a false turn-on. This circuit can only be adjusted for one particular point of operation, that is, either turn on or turn off and, because of the extremely high resistor values used in the design, the circuit operation is not stable at elevated temperatures.

As noted above, the transistor Q1 serves to couple the video detector circuitry to the prior art carrier detector circuitry, and the voltage at the anode of CR1 is a voltage which varies linearly with respect to the frequency of the signal presented to the base of Q1.

This prior art circuit had a two level output from the collector of Q4, of either 18 volts or substantially 0 volts where the 18 volt signal was indicative of an information signal being present. When Q4 is conducting a very substantial voltage drop occurs across R1 and thus the output to the motor control logic is substantially 0 volts but when Q4 is nonconducting the output to the motor control logic input is substantially at the 18 volt potential. Q4 is conducting when Q3 is not and similarly when Q3 is conducting Q4 is not. Q3 follows Q2 between conducting and nonconducting states since Q2 and Q3 form essentially a resistively coupled amplifier circuit with positive feedback path R7. When the emitter of Q2 is at a higher potential than the base of Q2, Q2 is conducting which in turn causes Q3 to conduct and Q4 to be non-conducting thus causing an output indication of 18 volts which indicates to the motor control logic that a carrier signal is present.

Figure 3:
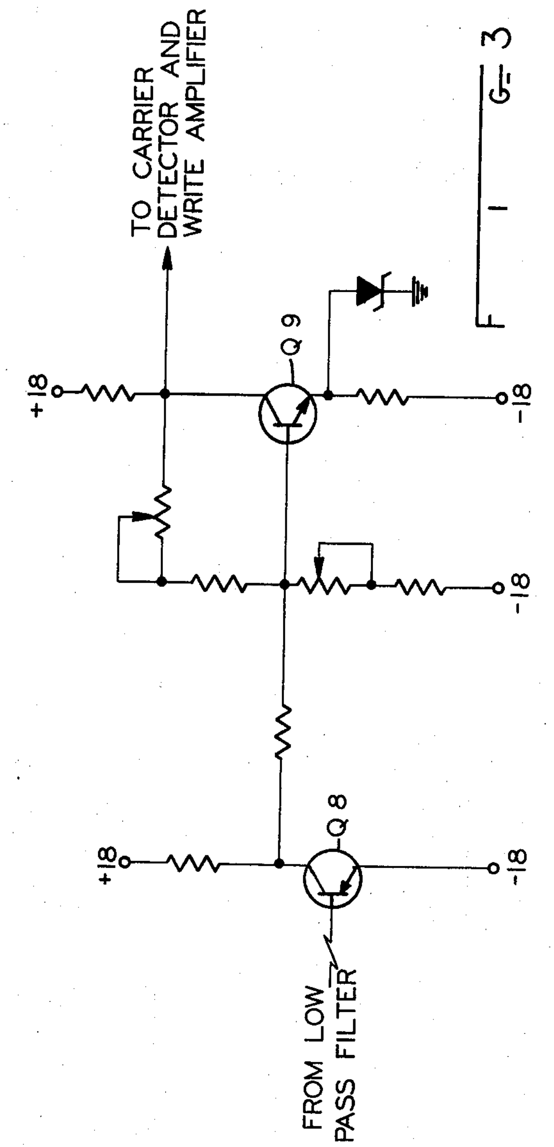
FIG. 3 is a schematic diagram of the DC amplifier which is used to drive the carrier detector of the present invention.
Figure 2B:
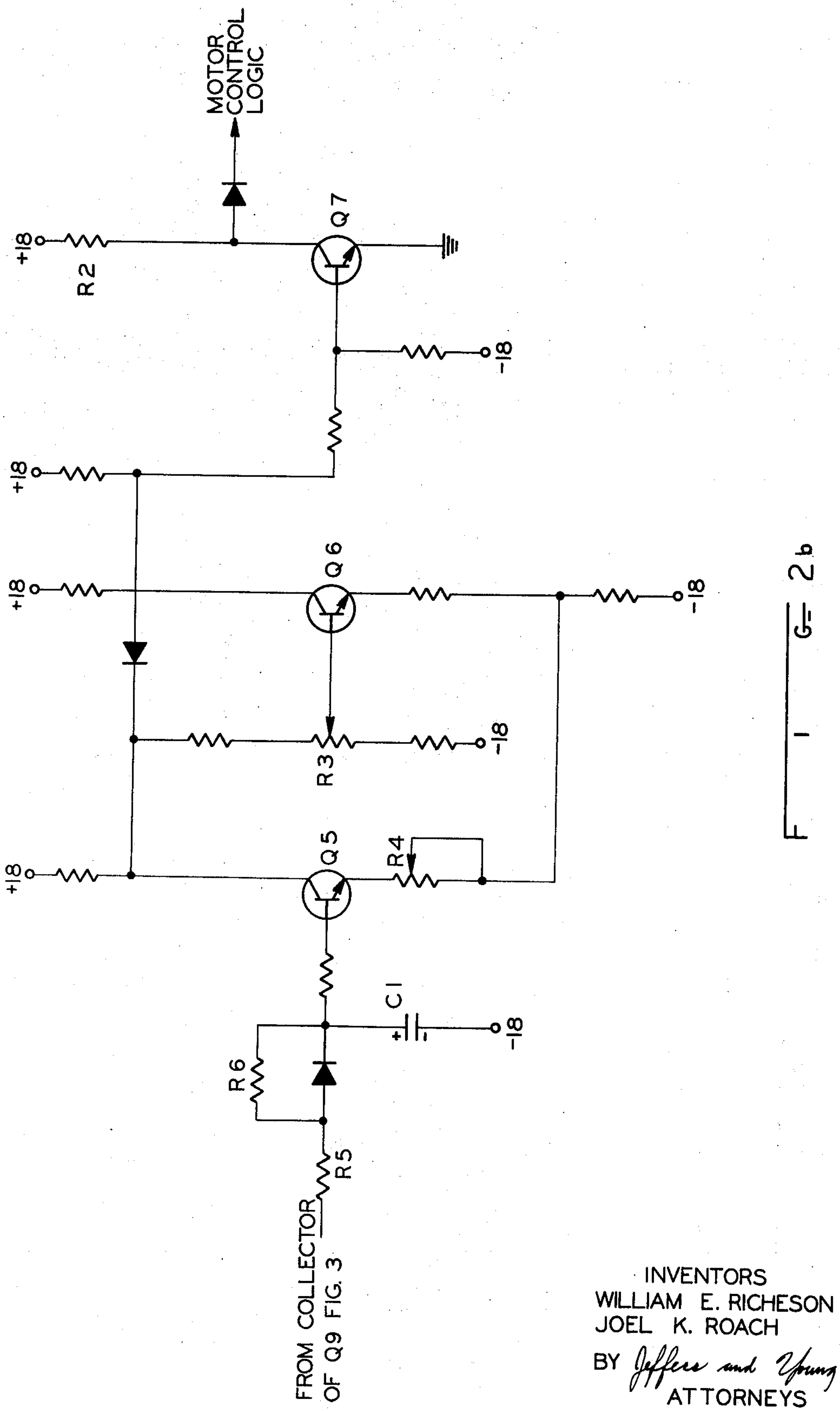
FIG. 2*b* is a schematic diagram of the carrier detector circuit of the present invention.

Turning now to FIG. 2*b* the carrier detector circuit of the present invention supplies substantially the same logic indications to the motor control logic circuitry as the prior art detector, that is a positive 18 volt indication is indicative of the presence of an information signal while a substantially 0 volt indication is indicative of a stop condition. When Q7 is conducting there is a substantial voltage drop in R2 and the output is close to 0 volts. On the other hand, when Q7 is nonconducting, the output terminal of the carrier detector circuit is at the 18 volt potential of the supply indicating the presence of an information signal. Like the prior art circuit, Q7 conducts if and only if Q5 does not. Q5 and Q6 are coupled together to form a Schmitt trigger circuit, that is, the two transistors form a bi-stable or flip-flop circuit which when driven by a DC level above a certain value changes from one of the transistors conducting to the other of the transistors conducting and here a stop tone triggers the circuit to cause Q6 to conduct while an information signal triggers the circuit to cause Q5 to conduct. A variable resistance R3 allows adjustment of the threshold level at which this triggering occurs and a variable resistance R4 controls the hysteresis loop characteristics of the trigger circuit. The input to the new carrier detector circuit is derived from the collector of Q9 of the DC amplifier circuit shown in FIG. 3. This DC amplifier circuit consists of two transistors Q8 and Q9 resistively coupled and receiving its input from the low pass filter 21 of FIG. 1*b*.

The output of this circuit is at a low impedance and is negative when the carrier of the phone circuit is less than 1,500 cycles per second and is positive when the carrier is greater than 1,500 cycles per second.

It might first appear that the stop tone frequency is redundant in this system since when a carrier signal is no longer present the receiver might be made to shut down. This is not quite accurate because a stop tone of a low repetition rate will hold the receiver in its off state whereas a lack of any signal will allow random noise to turn the system on since the repetition rate of this random noise can be within the range of 300 to 3,000 cycles per second.

To achieve proper adjustment of the FIG. 2*b* detector circuit, an input signal of approximately 1,350 cycles per second is applied and the resistor R3 varied until this input signal is adequate to switch the trigger circuit so that Q5 is conducting while Q6 and Q7 are nonconducting. The input signal is then lowered to 1250 cycles per second and R4 is adjusted until the trigger circuit again switches so that Q6 is conducting, that is, the output signal from Q7 switches from 18 volts back to 0 volts. These parameters are of course for a specific embodiment which as noted earlier had a turn-off time of approximately two seconds and a turn on time of approximately 0.8 seconds. Some iteration of this process is required in order to achieve optimum setting of the carrier detector circuit, thus after applying the hypothetical stop signal of 1250 cycles per second and adjusting R4 so that the output went back to 0 volts we now apply a 1,350 cycle per second signal and again adjust R3 until the output switches from its 0 volt status back to the 18 volt indication of the presence of an information signal. The input circuit parameters to this carrier detector circuit, that is R5, R6 and C1 may be selected or varied in order to achieve the desired turn-on and turn-off times. The turn-off time of the circuit is most readily controlled by varying R6 since variations in C1 effect not only the turn-off time but also the turn-on time.

In summary then, the invention is seen to reside in providing a trigger circuit for receiver which senses for the presence of a first predetermined signal having a frequency outside of the spectrum of transmitted information and which switches to a state calling for a deenergization of the receiver in response to sensing that first predetermined signal. This trigger circuit also senses for the presence of a second predetermined signal having a frequency inside the spectrum of the transmitted information or above a certain frequency, and which is thus indicative of the fact that information is present and switches back to its first state in response to the presence of that second predetermined signal or a signal above a predetermined frequency. The hysteresis loop characteristics of this trigger circuit may be varied to control the turn-on and turn-off frequencies and other parameters within the circuit may be varied in order to achieve the desired response time characteristics.

Thus while the invention has been described with respect to a specific embodiment, numerous modifications will suggest themselves to persons of ordinary skill in the art and the scope of the invention is to be measured only by that of the appended claims.

We claim:

1. In a facsimile receiver responsive to frequency modulated audio signals within a predetermined frequency range to provide a facsimile of an original scanned document, an improved device for enabling and at least partially disabling said receiver in response to received signals comprising:

bi-stable means responsive to signals indicative of receipt by said receiver of signals within said predetermined frequency range to assume a first of its bi-stable states and responsive to signals indicative of receipt by said receiver of signals within a second predetermined frequency range at least partially outside said first predetermined frequency range to assume the second of its bi-stable states, said bi-stable means following a hysteresis loop having two points of stability;

means for varying a first of said points of stability without substantially changing the second of said points of stability; and means responsive to said bi-stable means switching to said first state for enabling said receiver, and responsive to said bi-stable means switching to said second state for at least partially disabling said receiver.

2. In a facsimile receiver responsive to frequency modulated audio signals within a predetermined frequency range in the neighborhood of 1,500 to 2,450 cycles per second to provide a facsimile of an original scanned document, and improved device for enabling and at least partially disabling said receiver in response to received signals comprising;

bi-stable means responsive to signals indicative of receipt by said receiver of signals within said predetermined frequency range to assume a first of its bi-stable states and responsive to signals indicative of receipt by said receiver of signals within a second predetermined frequency range below 1,500 cycles per second and thus entirely outside said first predetermined frequency range to assume the second of its bi-stable states, said bi-stable means requiring a signal duration to assume the second of its bi-stable states which is at least twice that required to cause the bi-stable means to assume the first of its bi-stable states; and means responsive to said bi-stable means switching to said first state for enabling said receiver, and responsive to said bi-stable means switching to said second state for at least partially disabling said receiver.

3. In a facsimile receiver responsive to frequency modulated audio signals within a predetermined frequency range to provide a facsimile of an original scanned document, an improved device for enabling and at least partially disabling said receiver in response to received signals comprising:

bi-stable means responsive to signals indicative of receipt by said receiver of signals within said predetermined frequency range to assume a first of its bi-stable states and responsive to signals indicative of receipt by said receiver of signals within a second predetermined frequency range at least partially outside said first predetermined frequency range to assume the second of its bi-stable states, said bi-stable means comprising a pair of like transistors, one said transistor having a variable resistance coupled to its base and the other said transistor having a variable resistance in its collector-emitter circuit whereby the first said variable resistance may be adjusted to vary the threshold for triggering the trigger circuit and the second said variable resistance may be varied to change the hysteresis loop of the trigger circuit: and means responsive to said bi-stable means switching to said first state for enabling said receiver, and responsive to said bi-stable means switching to said second state for at least partially disabling said receiver.

* * * * *